(12) United States Patent
Kim

(10) Patent No.: US 6,192,015 B1
(45) Date of Patent: Feb. 20, 2001

(54) METHOD AND APPARATUS FOR RECORDING AND REPRODUCING RECORDING MEDIUM

(75) Inventor: Dae Young Kim, Seoul (KR)

(73) Assignee: LG Electronics Inc., Seoul (KR)

( * ) Notice: Under 35 U.S.C. 154(b), the term of this patent shall be extended for 0 days.

(21) Appl. No.: 09/186,336

(22) Filed: Nov. 5, 1998

(30) Foreign Application Priority Data

Nov. 6, 1997 (KR) .................................................. 97-58607
Nov. 12, 1997 (KR) .................................................. 97-59476

(51) Int. Cl.[7] ..................................................... G11B 5/09
(52) U.S. Cl. ........................................ 369/48; 369/124.14
(58) Field of Search ................................... 369/44.13, 47, 369/48, 49, 54, 124.01, 124.04, 124.14, 275.4

(56) References Cited

U.S. PATENT DOCUMENTS

| | | | |
|---|---|---|---|
| 5,508,985 | * | 4/1996 | Fairchild et al. ....................... 369/48 |
| 5,615,185 | * | 3/1997 | Horikiri ............................... 369/47 X |
| 5,754,522 | * | 5/1998 | Kobayashi et al. ........... 369/275.4 X |

* cited by examiner

Primary Examiner—Paul W. Huber

(57) ABSTRACT

A recording/reproducing method and apparatus that is capable of driving a recording medium of land/groove recording system using a wobbling signal without a land/groove identification information. The method and apparatus detects the wobbling signal from a recording medium having wobbled land and groove tracks and then multiplies a frequency of the wobbling signal. In the method and apparatus, various control are performed on a basis of a period and a phase of the multiplied wobble signal, so that it becomes unnecessary to switch the polarity of the wobbling signal for the land/groove identification.

20 Claims, 8 Drawing Sheets

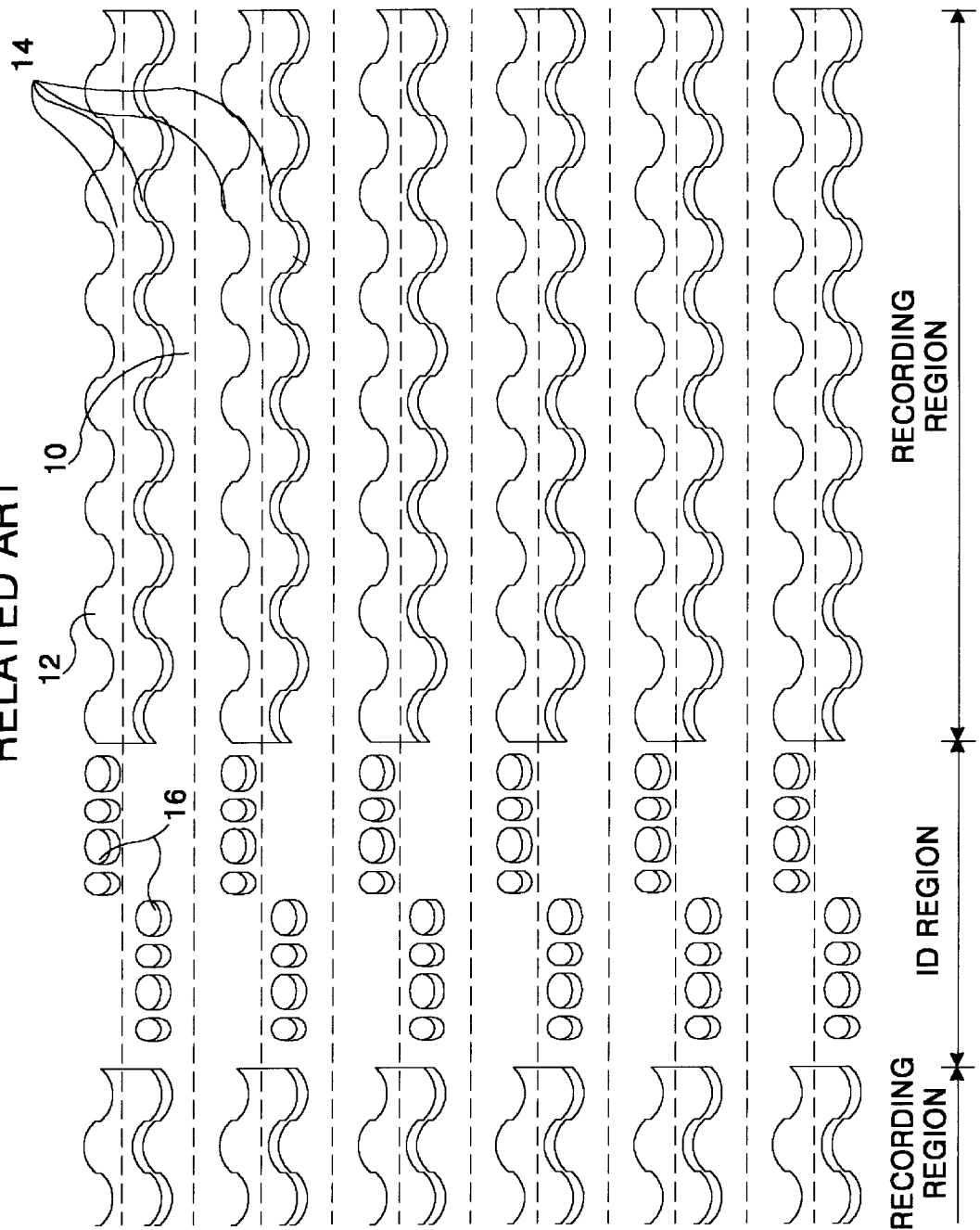

METHOD AND APPARATUS FOR RECORDING AND REPRODUCING RECORDING MEDIUM

BACKGROUND OF THE INVENTION

1. Field of the Invention

This invention relates to a method and apparatus for performing a recording/reproduction of an information on/from a recording medium having recording tracks each defined by wobbled grooves.

2. Description of the Related Art

Nowadays, a need of a larger capacity has been increased in an optical recording/reproducing field or an opto-magnetic recording/reproducing field. Accordingly, in a recording medium such as a DVD-RAM (digital versatile disc-random access memory) and so on, there has been suggested a so-called land/groove recording system having an information recorded on both of land and groove tracks.

For example, a DVD-RAM as shown in FIG. 1 is provided with wobbled groove tracks 10 and land tracks wobbled alternately with the groove tracks 10 in the width direction of the groove tracks 10. The groove and land tracks 10 and 12 are used as recording regions. A certain period of wobbling signals are included in a wobbled portion 14 of each of the groove and land tracks 10 and 12, hereinafter referred to as "wobbled part", that is, in each side of the land and groove tracks 10 and 12. A recording/reproducing apparatus for an optical recording medium generates a rotation control information about the DVD-RAM and a recording clock with the aid of the wobbling signals. Also, each of the land and groove tracks 10 and 12 is alternated with a identification (ID) region consisting of a pre-pit train 16. The pre-pit train 16 includes an address information for indicating the physical position of the groove and land tracks 10 and 12. The physical positions of all the groove and land tracks 10 and 12 are indicated with such ID regions, thereby recording an information on all the groove and land tracks 10 and 12. As a result, a large amount of information can be recorded in the DVD-RAM.

In the optical recording medium of such a land/groove recording system, wobbling signals detected from each of the adjacent groove and land tracks 10 and 12 have a contrary phase to each other. This is caused by a physical shape and an optical characteristic in the groove and land tracks 10 and 12. Thus, when a laser light beam is transferred from the groove track 10 to the land track 12 or vice versa, a phase of the wobbling signal is inverted. For example, in a single-spiral type of recording medium, the wobbled groove and land tracks 10 and 12 are alternated every once rotation, so that a phase of the wobbling signal is inverted whenever the recording medium is rotated once. More specifically, an electrical signal as shown in FIG. 2A is detected from the groove track 10 while an electrical signal as shown in FIG. 2B is detected from the land track 12. Referring to FIGS. 2A and 2B, it is to be noted that first and second wobbling signal 13A and 13B detected from the groove track 10 are phases contrary to third and fourth wobbling signals 13C and 13D detected from the land track 12, respectively. When a light beam enters the land track 12 from the groove track 10, the fourth wobbling signal 13D in FIG. 2B having a phase contrary to the first wobbling signal 13A in FIG. 2A emerges at the rear portion of the first wobbling signal 13A. On the other hand, when a light beam enters the groove track 12 from the land track 12, the second wobbling signal 13B in FIG. 2A having a phase contrary to the third wobbling signal 13C in FIG. 2B emerges at the rear portion of the third wobbling signal 13C. In other words, in the single-spiral type of optical recording medium, the land and groove tracks are alternated or replaced every once rotation, so that a phase of the wobbling signal becomes inconsistent at their crossing position.

Meanwhile, a general recording clock is generated by slicing the wobbling signal 13 into a zero-crossing level to generate a wobbling pulse signal having a rectangular wave shape and then applying the wobbling pulse signal to a phase synchronizing loop. The recording clock generated in this manner has a different phase whenever a light beam is transferred from the groove track 10 to the land tracks 12 or vice versa. This results from a phase of the wobbling signal being inverted whenever a light beam is transferred from the groove track 10 to the land track 12 or vice versa. A rotation control information produced based on the recording clock also becomes different whenever a light beam is transferred from the groove track 10 to the land track 12 or vice versa. Accordingly, a recording/reproducing apparatus for the optical recording medium must invert the polarity of the wobbling signal each time a light beam is transferred from the groove track 10 to the land track 12 or vice versa so as to perform the generation of recording clock and the rotation control accurately.

In order to switch the polarity of the wobbling signal, the recording/reproducing apparatus must accurately identify whether a track being currently driven (i.e., recorded or reproduced) is a land track or a groove track. If such a land/groove identification is accurately performed, then it is impossible for the recording/reproducing apparatus to do the clock generation and the rotation control smoothly. In addition, a tracking control of push-pull system also requires the land/groove identification. This results from the polarity of the tracking error signal being inverted each time a light beam is transferred from the groove track to the land track or vice versa. Likewise, when the land/groove identification is accurately performed, the tracking control of push-pull system also is not done smoothly.

The above-mentioned land/groove identification is usually dependent upon a push-pull signal detected from the identification (ID) region. However, the push-pull signal may be not at all detected or may be inaccurately detected from the optical recording medium. For example, since a header region is not read in the case of performing an additional operation such as a track search and so on, the push-pull signal is not at all detected. Further, the push-pull signal is not detected accurately in the case of having a large tracking offset. It becomes difficult to do the land/groove identification when the push-pull signal at the header region as mentioned above is not detected accurately.

SUMMARY OF THE INVENTION

Accordingly, it is an object of the present invention to provide a driving method and apparatus for a recording medium that can drive a recording medium of land/groove recording system using a wobbling signal without a land/groove identification information.

Further object of the present invention is to provide a recording/reproducing method and apparatus for a recording medium that can perform a recording/reproducing of a recording medium of land/groove recording system by obtaining a land/groove identification in the recording medium with a wobbling signal.

In order to achieve these and other objects of the invention, a recording/reproducing method for a recording medium according to one aspect of the present invention includes the steps of detecting a wobbling signal from a recording medium having wobbled land and groove tracks; multiplying a frequency of the wobbling signal; generating a predetermined reference signal based on the multiplied wobble signal; and responding to the reference signal to perform a recording/reproduction of the recording medium. The recording/reproducing method further includes the steps of detecting a playing speed error of the land and groove tracks from the reference signal; and controlling a playing speed of the land and groove tracks in accordance with the playing speed error. The recording/reproduction of the recording medium. The recording/reproducing method further includes the steps of detecting whether any one of the land and groove tracks is being accessed on a basis of a phase relationship of the reference signal with the wobbling signal; and selectively inverting the polarity of a tracking error signal in accordance with a type of the track being accessed and controlling a position of a light beam in accordance with the selectively inverted tracking error signal.

A recording/reproducing apparatus for a recording medium according to another aspect of the present invention includes wobbling signal detecting means for detecting a wobbling signal from a recording medium having wobbled land and groove tracks; frequency multiplying means for multiplying a frequency of the wobbling signal; reference signal generating means for generating a predetermined reference signal based on the multiplied wobble signal; and recording/reproducing means for responding to the reference signal to perform a recording/reproduction of the recording medium. The recording/reproducing apparatus further includes error detecting means for detecting a playing speed error of the land and groove tracks from the reference signal; and speed control means for controlling a playing speed of the land and groove tracks in accordance with the playing speed error. The recording/reproducing apparatus further includes land/groove identifying means for detecting whether any one of the land and groove tracks is being accessed on a basis of a phase relationship of the reference signal with the wobbling signal; and a tracking servo for selectively inverting the polarity of a tracking error signal in accordance with an output signal of the land/groove identifying means and controlling a position of a light beam in accordance with the selectively inverted tracking error signal.

BRIEF DESCRIPTION OF THE DRAWINGS

These and other objects of the invention will be apparent from the following detailed description of the embodiments of the present invention with reference to the accompanying drawings, in which:

FIG. 1 is a schematic view showing the track structure of a DVD-RAM having recording regions consisting of land and groove tracks and ID regions consisting of pre-pit trains;

DETAILED DESCRIPTION OF THE PREFERRED EMBODIMENT

Figure 2A:
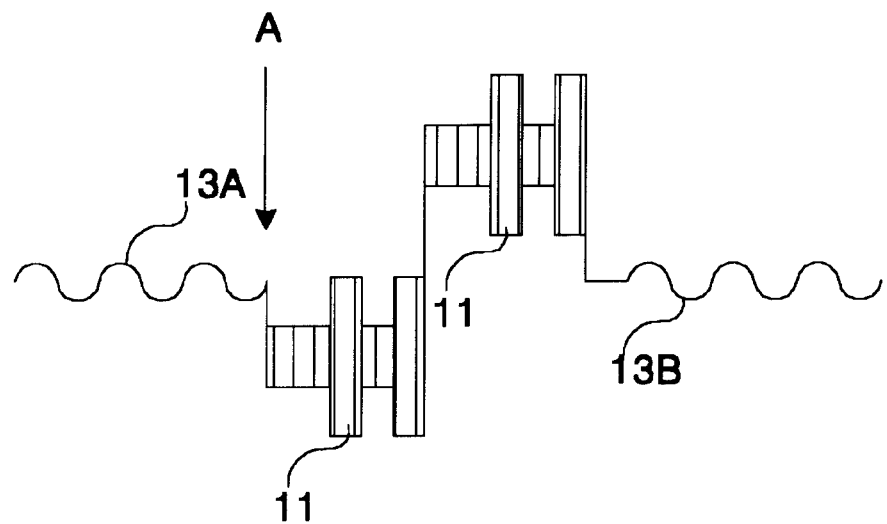
FIGS. 2A and 2B are waveform diagrams of electrical signals detected boundary portions between land and groove tracks of an optical disc.
Figure 2B:
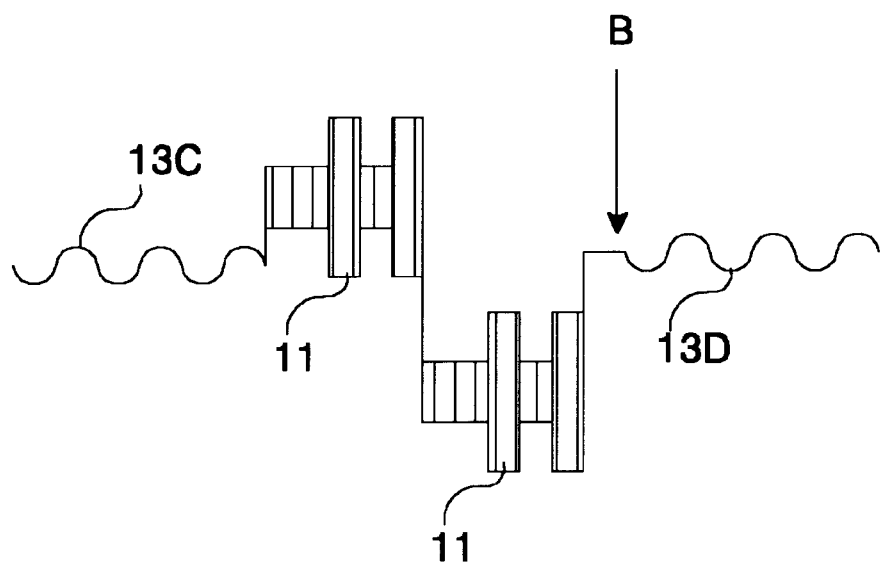
Figure 3:
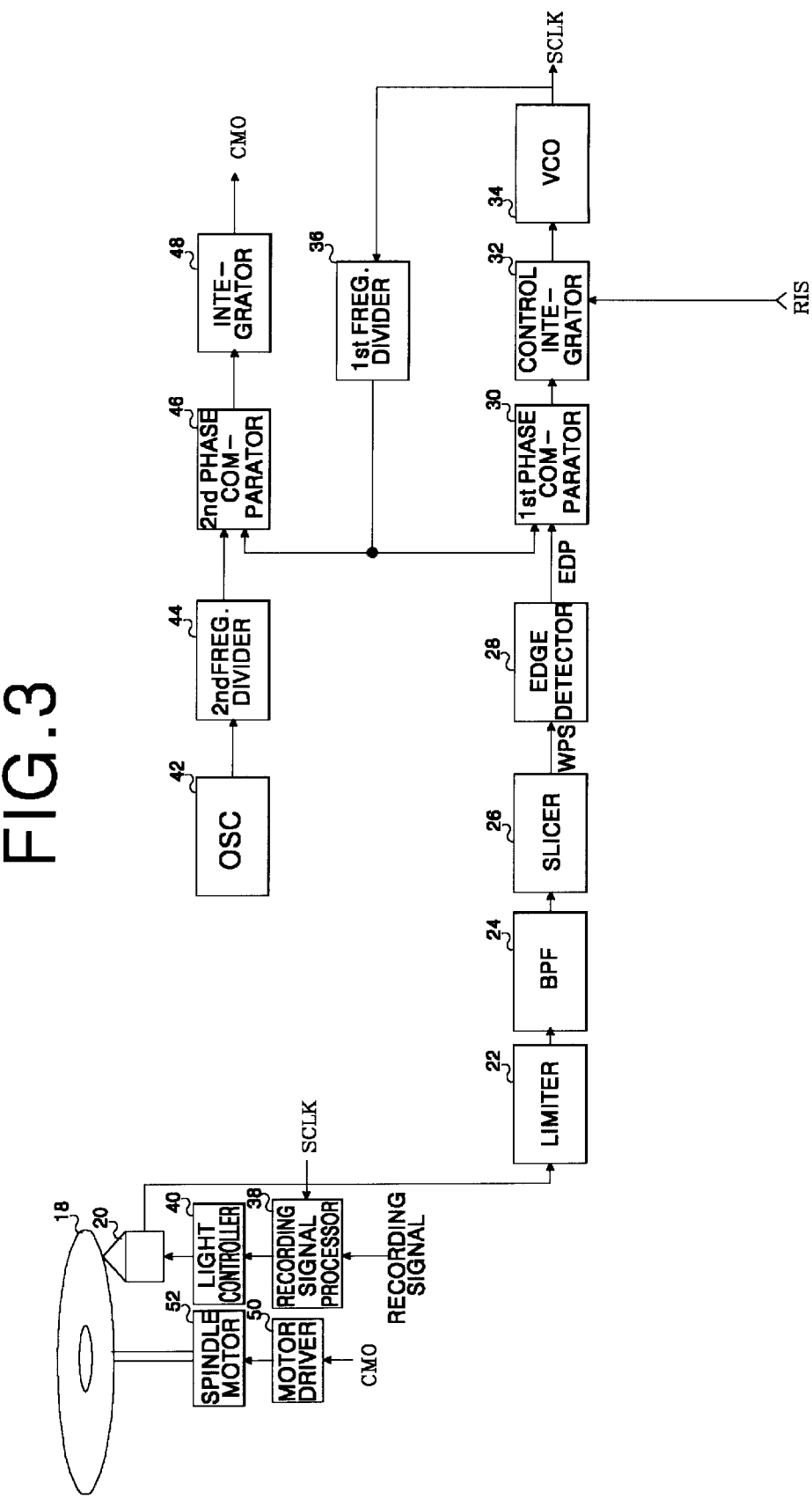
FIG. 3 is a schematic block diagram showing the configuration of a recording/reproducing apparatus for an optical recording medium according to an embodiment of the present invention.

Referring to FIG. 3, there is shown a recording/reproducing apparatus for an optical recording medium according to an embodiment of the present invention for recording a user information on an optical disc of land/groove recording system. The recording/reproducing apparatus includes a limiter 22, a controlling BPF 24, a slicer 26 and an edge detector 28 that are connected to a pickup 20 in series. The pickup 20 irradiates a laser light beam onto an optical disc of land/groove recording system as shown in FIG. 1, and converts a reflective light quantity reflected by the optical disc 18 into an electrical signal. The electrical signal generated at the pickup 20 has waveforms shown in FIG. 2A and FIG. 2B. FIG. 2A shows an electrical signal generated at the pickup 20 when a light beam is irradiated onto the groove track 10, and FIG. 2B shows an electrical signal generated at the pickup 20 when a light beam is irradiated onto the land track 12. Such an electrical signal is level-limited by means of the limiter 22 to eliminate a pit train signal 11. In this case, only a wobbling signal 13 may be included or a radio frequency component of information signal along with the wobbling signal 13 may be included in an output signal of the limiter 22. The radio frequency component of information signal is included in the output signal of the limiter 22 when a user information is recorded on groove and land tracks 10 and 12. The BPF 24 eliminates the radio frequency component of information signal that may be included in the output signal of the limiter 22, thereby detecting a wobbling signal 13 distributed at a constant frequency band. The wobbling signal 13 detected by the controlling BPF 24 has a contrary phase in accordance with whether any one of the land track 12 and the groove track 10 is accessed. Then, the wobbling signal 13 is level-sliced and logicalized by means of the slicer 26, so that it is waveform-shaped into a rectangular waveform shape. The edge detector 28 detects the rising edge and the falling edge of the waveform-shaped wobbling pulse signal WPS from the slicer 26 and generates an edge detecting pulse EDP in which a specified logic of pulses are positioned at the rising and falling edges of the wobbling pulse signal WPS. Even when the wobbling signal is phase-inverted, the edge detecting pulse EDP has a constant phase. In other words, even when the wobbling signal is phase-inverted, a phase of the edge detecting pulse EDP is not changed. Such an edge detector 28 has a configuration as shown in FIG. 4 which will be explained later.

A first phase comparator 30, a controlling integrator 32 and a voltage controlled oscillator (VCO) 34 are connected to the edge detector 28 in cascade, and a first frequency divider 36 is connected between the VCO 34 and the phase comparator 30. The first phase comparator 30 compares a phase of the edge detecting pulse EDP from the edge detector 28 with that of a clock signal from the first frequency divider 36 and generates a phase error signal having a voltage level changing in accordance with the resultant phase difference. This phase error signal is integrated using the controlling integrator 32. The controlling integrator 32 performs an integration and hold operation in accordance with a logical value of a region identification signal RIS. More specifically, during an envelop interval of the electrical signal, that is, during a time interval when a light beam is positioned at a recording region of the land or groove track 12 or 10, the controlling integrator 32 integrates a phase error signal from the first phase comparator 30 and applies the integrated phase error signal to the VCO 34. Otherwise, during a pit train signal interval of the electrical signal, that is, during a time interval when a light beam is positioned at an ID region of the pit train 16, the controlling integrator 32 holds a phase error signal integrated in the envelop interval and applies the held phase error signal to the VCO 34. In other words, the controlling integrator 32 applies the phase error signal detected the wobbling signal interval to the VCO 34 during a time interval when the pit train signal 11 instead of the wobbling signal 13 is detected. Meanwhile, the controlling integrator 32 may be replaced by a conventional integrator without a control line in the case of being applied to a recording apparatus for an optical recording medium for accessing an optical disc having only the land and groove tracks 12 and 10 wobbled without the pre-pit train 16. On the other hand, the limiter 22, the BPF 24, the slicer 26 and the edge detector 28 including the first phase comparator 30 may respond to the region identification signal RIS to be operated only during a time interval when the wobbling signal 13 is detected in similarity to the controlling integrator 32. The VCO 34 responding to the integrated phase error signal from the controlling integrator 32 controls an oscillation period in accordance with a voltage level of the integrated phase error signal to generate a channel bit clock SCLK having the same phase as the edge detecting pulse EDP. A frequency of the channel bit clock SCLK can be set to have a value equal to or higher, by an integer multiple, than that of the edge detecting pulse EDP. The channel bit clock SCLK is applied to a recording signal processor 38 to control a recording speed of a user information recorded on the optical disc 18. Also, the channel bit clock SCLK is varied in accordance with a rotation speed of the optical disc 18 to maintain a recording density of the optical disc 18 constantly. The recording signal processor 38 converts a user information into a channel bit stream that is a shape required by the optical disc 18, and transfers the channel bit stream to a light controller 40 in conformity to the channel bit clock SCLK from the VCO 34. The light controller 40 intermits a light source included in the pickup 20 in accordance with a logical value of the channel bit stream from the recording signal processor 38, thereby recording a user information on the land or groove tracks 12 and 10 of the optical disc 18. The first frequency divider 36 frequency-divides the channel bit clock SCLK from the VCO 34 by a first predetermined number(e.g., 93) and applies the frequency-divided channel bit clock to the first phase comparator 36.

The recording/reproducing apparatus further includes a second frequency divider 44, a second phase comparator 46, an integrator 48, a motor driver 50 and a spindle motor 52 that are connected to an oscillator 42 in cascade. The oscillator 42 generates an oscillation signal having a constant frequency. This oscillation signal is frequency-divided by a second predetermined number by means of the second frequency divider 44 and applied to the second comparator 46 as a reference signal. The reference signal generated at the second frequency-divider 44 indicates a reference rotation speed, that is, a reference playing speed of the land and groove track 12 and 10. The second phase comparator 46 detects a phase difference between the reference signal(or the frequency-divided oscillation signal) from the second frequency divider 44 and the frequency-divided channel bit clock from the first channel frequency divider 36 and generates a second phase error signal having a voltage corresponding to the phase difference. The second phase error signal is integrated with the integrator 48 and applied to a motor driver 50 as a rotation error signal CMO. Then, the motor driver 50 accelerates or decelerates a rotation speed of a spindle motor 52 in accordance with a voltage level of the rotation error signal CMO from the integrator 48, thereby maintaining a rotation speed of the optical disc 18, that is, a playing speed of the land and groove tracks 12 and 10 constantly.

Figure 4:
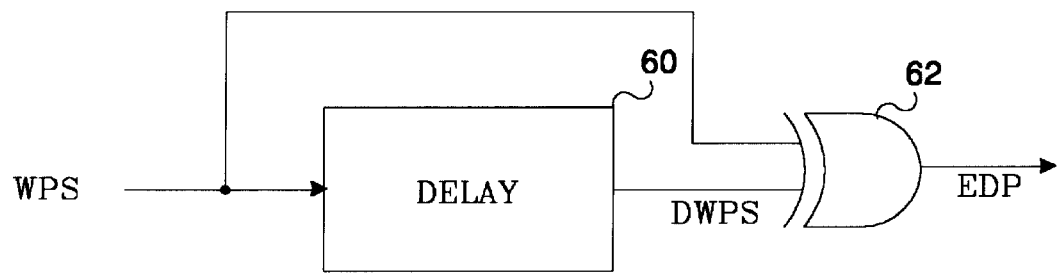
FIG. 4 is a detailed view of the edge detector in FIG. 2.

FIG. 4 shows a detailed circuit of the edge detector 28 in FIG. 2. In FIG. 4, the edge detector 28 includes a delay 60 and a first exclusive OR gate 62, hereinafter referred to as "EOX gate", for commonly receiving the waveform-shaped wobbling signal from the slicer 26 in FIG. 2. The delay 60 delays the wobbling pulse signal WPS by a certain time and applies the delayed wobbling pulse signal DWPS to the EOX gate 62. The first EOX gate 62 changes its output logical value in accordance with whether or not a logical value of the wobbling pulse signal WPS from the slicer 26 is equal to that of the delayed wobbling signal DWPS from the delay 60. More specifically, the first EOX gate 62 generates a logical value of "0" when logical values of the two input signals are same; while generating a logical value of "1" when they are different. By such an operation, an edge detecting pulse EDP having a width corresponding to a delay amount of the delay 60 is generated every edge of the wobbling pulse signal WPS at the first EOX gate 62. The edge detecting pulse EDP has a double of frequency compared with the wobbling pulse signal WPS. Accordingly, the edge detecting pulse EDP has always an identical phase even though a phase of the wobbling pulse signal WPS is inverted, that is, even though any one of the land and groove tracks 12 and 10 is driven. This will become apparent from FIGS. 5A and 5B.

Figure 5A:
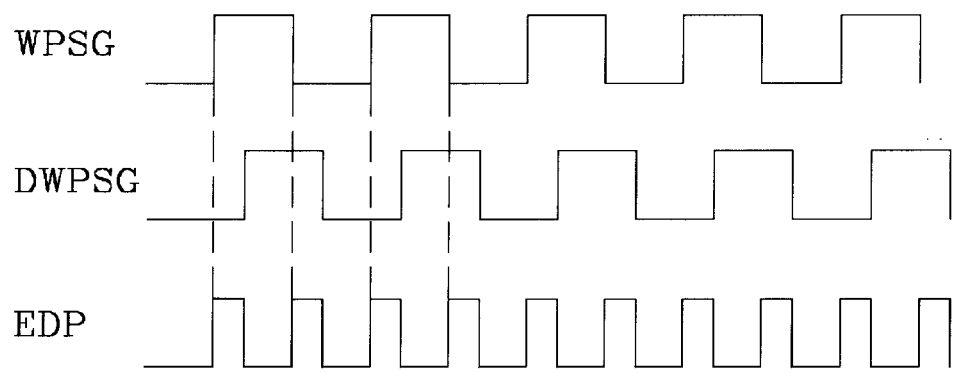
FIG. 5A is input/output waveform diagrams of each part of the edge detector in FIG. 4 when a groove track is driven.
Figure 5B:
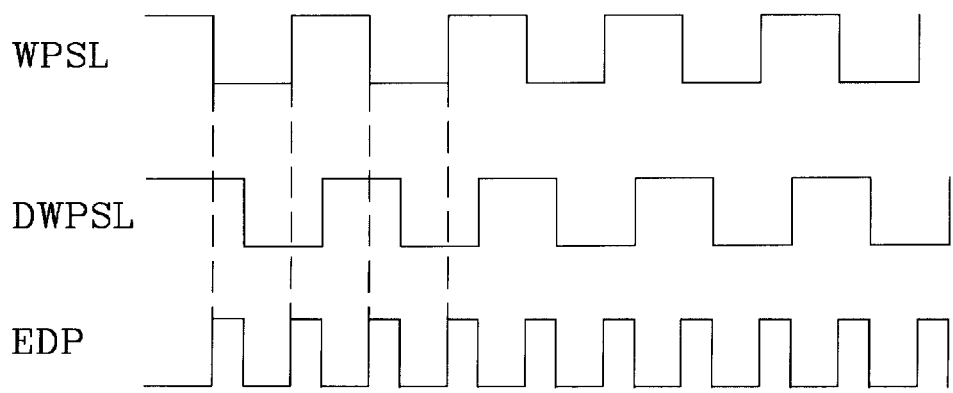
FIG. 5B is input/output waveform diagrams of each part of the edge detector in FIG. 4 when a land track is driven.

FIG. 5A shows waveforms of a wobbling pulse signal WPSG, a delayed wobbling signal DWPSG and an edge detecting pulse EDP when the groove track 10 is driven, and FIG. 5B shows waveforms of a wobbling pulse signal WPSL, a delayed wobbling pulse signal DWPSL and an edge detecting pulse EDP when the land track 12 is driven. Referring now to FIGS. 5A and 5B, it is to be noted that the edge detection pulses EDP have the identical phase even when the two wobbling pulse signals WPSG and WPSL have a contrary phase to each other. Accordingly, a polarity switching of the wobbling signal according to the land/groove tracks is unnecessary unlike the prior art. In other words, the generation of channel bit clock SCLK and the rotation control of optical disc as mentioned above make use of the edge detection pulse EDP having the same phase independently of the land/groove track, so that they can be stably performed even when any one of the land/groove tracks is accessed.

Figure 6:
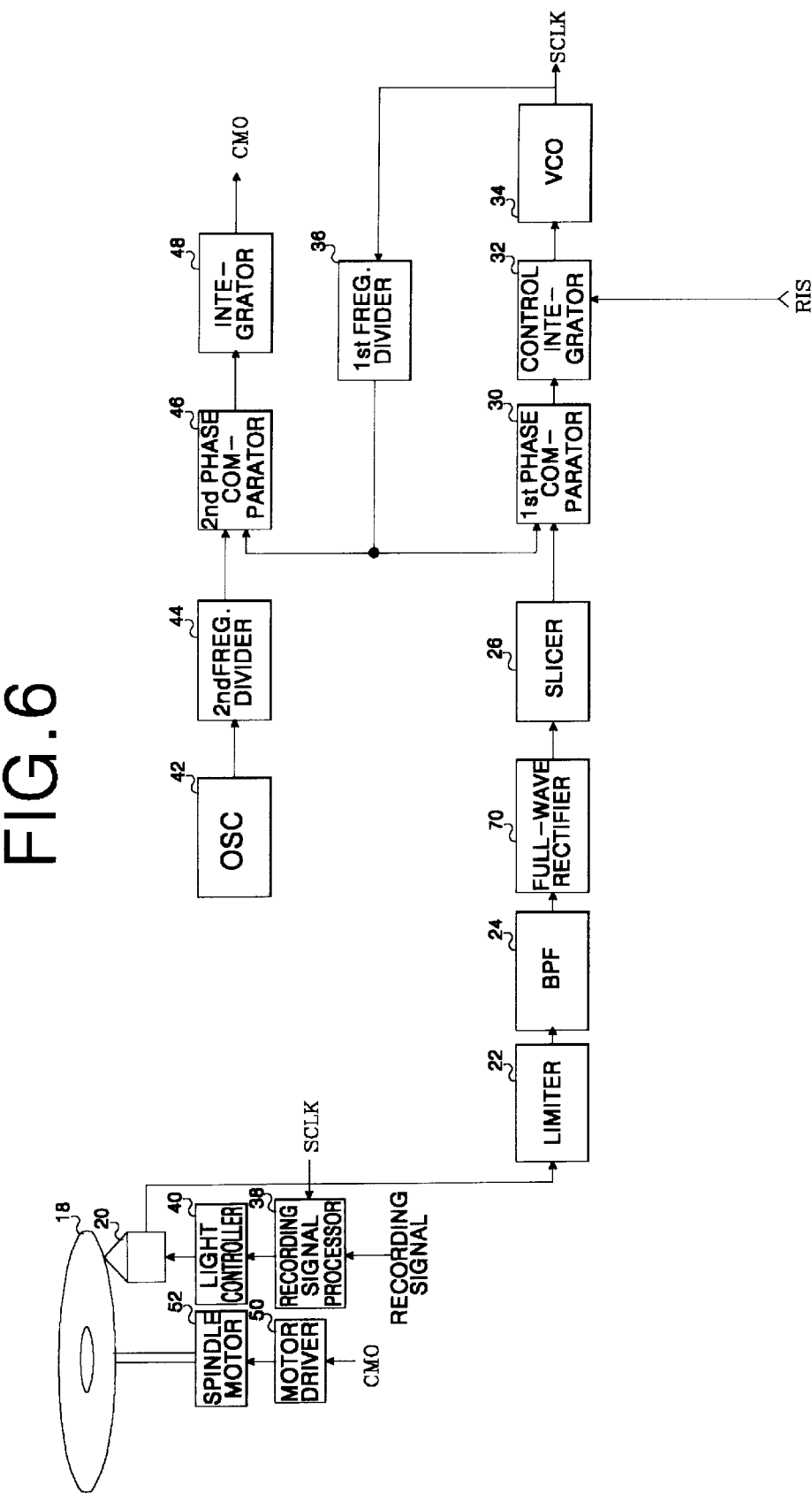
FIG. 6 is a schematic block diagram showing the configuration of a recording/reproducing apparatus for an optical recording medium according to another embodiment of the present invention.

Referring to FIG. 6, there is shown a recording/ reproducing apparatus for a recording medium according to another embodiment of the present invention. The recording/reproducing apparatus in FIG. 6 has the same circuit configuration as the recording/reproducing apparatus in FIG. 3 except that the BPF 24 and the slicer 26 are replaced by a full-wave rectifier 70 and a slicer 26 is connected to a first comparator 30 directly. The full-wave rectifier 70 makes a full-wave rectification of a wobbling signal detected by a BPF 24 and applies the full-wave rectified wobbling signal to the slicer 26. The slicer 26 level-slices and logicalizes the full-wave rectified wobbling signal to thereby a wobbling pulse signal WPS having a rectangular wave shape. The wobbling pulse signal WPS generated at the slicer 26 has the same phase and frequency as an edge detecting pulse EDP outputted from the edge detector in FIG. 3, thereby having a constant phase even though a wobbling signal 13 is inverted. In other words, even when the wobbling signal 13 is inverted, a phase of the output signal of the slicer 26 is not changed. Accordingly, a phase of a channel bit clock SCLK outputted at the VCO 34 in such a manner to be synchronized with the output signal of the slicer 26 is kept constantly even though the wobbling signal 13 is phase-inverted. Further, a rotation speed error is stably detected at an integrator 48, thereby maintaining a rotation speed and a track playing speed of the optical disc 18 constantly.

Figure 7:
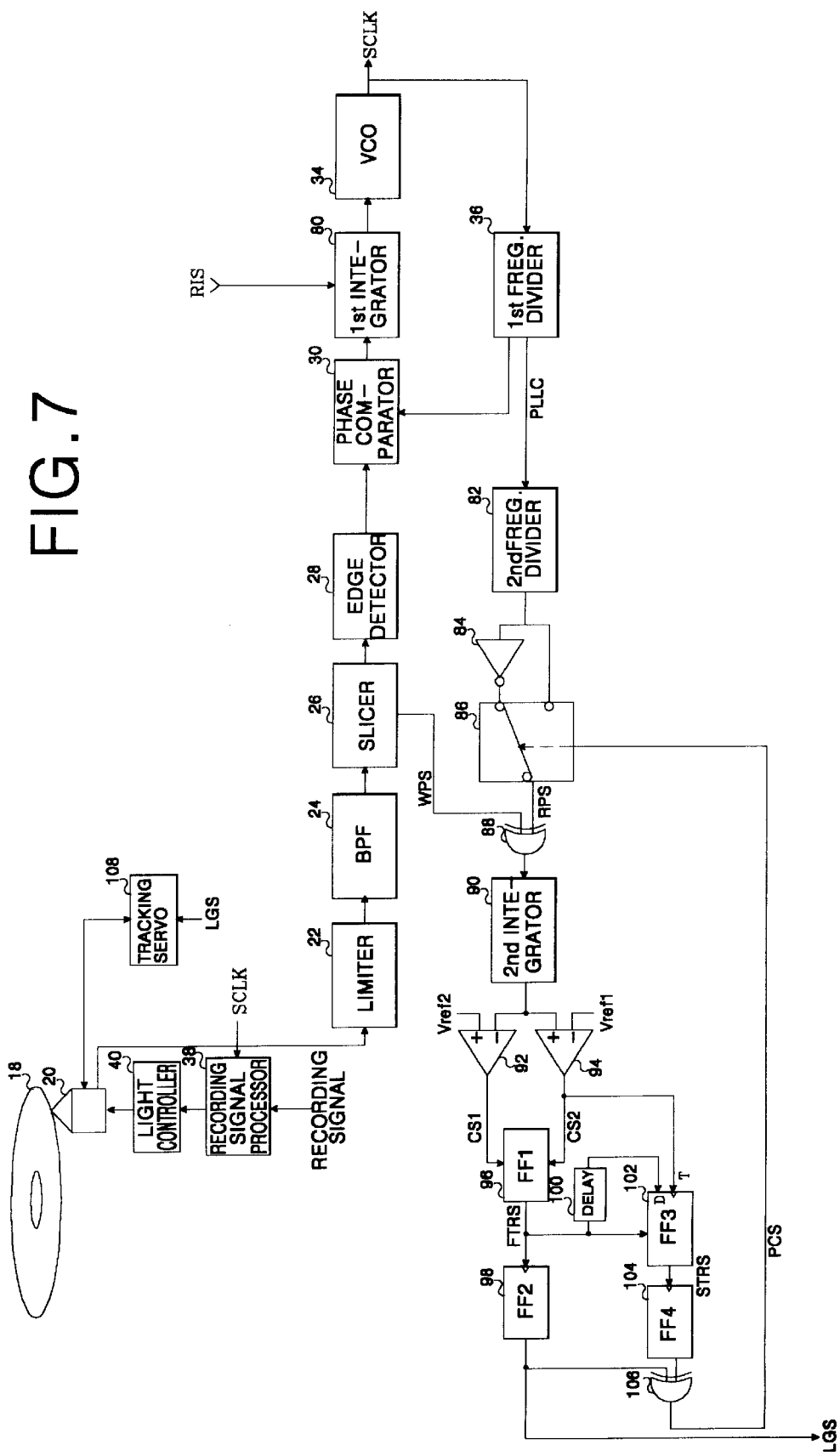
FIG. 7 is a schematic block diagram showing the configuration of a recording/reproducing apparatus for an optical recording medium according to still another embodiment of the present invention.

Referring now to FIG. 7, there is shown a recording/reproducing apparatus for an optical recording medium according to an embodiment of the present invention that performs a recording/reproduction of an optical disc by identifying land/groove tracks using a wobbling signal. The recording/reproducing apparatus includes a limiter 22, a BPF 24 and a slicer 26 that are connected to a pickup 20 in series. The pickup 20 irradiates a laser light beam onto an optical disc 18 of land/groove recording system as shown in FIG. 1, and converts a reflective light quantity reflected by the optical disc 18 into an electrical signal. The electrical signal generated at the pickup 20 has waveforms shown in FIG. 2A and FIG. 2B. This electrical signal is level-limited by means of the limiter 22 to eliminate a pit train signal 11. The pit train signal 11 is not detected at an optical disc 18 having successive groove and land tracks 10 and 12. In this case, only a wobbling signal 13 may included or a radio frequency component of information signal along with the wobbling signal 13 may included in an output signal of the limiter 22. The radio frequency component of information signal is included in the output signal of the limiter 22 when a user information is recorded on groove and land tracks 10 and 12. The BPF 24 eliminates the radio frequency component of information signal that may be included in the output signal of the limiter 22, thereby detecting a wobbling signal 13 distributed at a constant frequency band. The wobbling signal 13 detected by the controlling BPF 24 has a contrary phase in accordance with whether any one of the land track 12 and the groove track 10 is accessed. Then, the wobbling signal 13 is level-sliced and logicalized by means of the slicer 26, so that it is waveform-shaped into a wobbling pulse signal WPS having a rectangular waveform shape.

An edge detector 28, a first phase comparator 30, a first integrator 80 and a VCO 34 are connected to the slicer 26 in cascade, and a first frequency divider 36 is connected between the VCO 34 and the phase comparator 30. The edge detector 28 detects the rising edge and the falling edge of the waveform-shaped wobbling pulse signal WPS from the slicer 26 and generates an edge detecting pulse EDP in which a specified logic of pulses are positioned at the rising and falling edges of the wobbling pulse signal WPS. Even when the wobbling signal is phase-inverted, the edge detecting pulse EDP has a constant phase. In other words, even though the wobbling signal is phase-inverted, a phase of the edge detecting pulse EDP is not changed. The phase comparator 30 compares a phase of the edge detecting pulse EDP from the edge detector 28 with that of a clock signal from the first frequency divider 36 and generates a phase error signal having a voltage level changing in accordance with the resultant phase difference. This phase error signal is integrated using the first integrator 80 to thereby eliminate a radio frequency of noise. The VCO 34 responding to the integrated phase error signal from the first integrator 80 controls an oscillation period in accordance with a voltage level of the integrated phase error signal to generate a channel bit clock SCLK having the same phase as the edge detecting pulse EDP. A frequency of the channel bit clock SCLK can be set to have a value equal to or higher, by an integer multiple, than that of the edge detecting pulse EDP. The channel bit clock SCLK is applied to a recording signal processor 38 to control a recording speed of a user information recorded on the optical disc 18. Also, the channel bit clock SCLK is varied in accordance with a rotation speed of the optical disc 18 to maintain a recording density of the optical disc 18 constantly. The recording signal processor 38 converts a user information into a channel bit stream that is a shape required by the optical disc 18, and transfers the channel bit stream to a light controller 40 in conformity to the channel bit clock SCLK from the VCO 34. The light controller 40 intermits a light source included in the pickup 20 in accordance with a logical value of the channel bit stream from the recording signal processor 38, thereby recording a user information on the land or groove tracks 12 and 10 of the optical disc 18. The first frequency divider 36 frequency-divides the channel bit clock SCLK from the VCO 34 by a first predetermined number(e.g., 2) to generate a phase locked loop clock PLLC having the same frequency as the edge detecting pulse. This phase locked loop clock PLLC is applied to the phase comparator 30.

A second frequency divider 82, an inverter 84 and a control switch 86 are connected to the first frequency divider 36. The second frequency divider 82 frequency-divides the phase locked loop clock PLLC from the first frequency divider 36 by two, thereby generating a clock signal having the same frequency as the wobbling pulse signal WPS. A phase of the clock signal generated at the second frequency divider 82 is not changed even when phases of the wobbling signal and the wobbling pulse signal WPS. The inverter 84 inverts the clock signal from the second frequency divider 82. If an output signal of the second frequency divider 82 has the same phase as a wobbling signal detected from the groove track 10, then an output signal of the inverter 84 has the same phase as a wobbling signal detected from the land track 12. The control switch 86 responds to a feedback polar control signal PCS to switch a clock signal from the second frequency divider 82 and a clock signal from the first inverter 84, thereby generating a reference pulse signal RPS. The reference pulse signal RPS is inverted after a certain time whenever a phase of the wobbling pulse signal WPS is inverted, thereby adaptively keeping up with a phase change in the wobbling pulse signal WPS.

The recording/reproducing apparatus further includes a first EOX 88 for receiving the wobbling pulse signal WPS from the slicer 26 and the reference pulse signal RPS from the control switch 86, and a second integrator 90 and a first comparator 92 that are connected, in series, to the first EOX 88. The first EOX 88 compares a logical value of the reference pulse signal RPS with that of the wobbling pulse signal WPS to thereby detect whether or not phases of the two signal are same, that is, whether a light beam is shifted from the groove track 10 into the land track 12 or vice versa. Also, the first EOX 88 generates a high logic of shift detection signal when the reference pulse signal PRS has a different logical value from the wobbling pulse signal WPS, that is, when a light beam is shifted from the groove track 10 into the land track 12 or vice versa. The second integrator 90 integrates a high logic interval of the shift detection signal from the EOX 88. The first comparator 92 detects a time interval when the output signal of the second integrator 90 excesses the first reference voltage Vref1. Also, the first comparator 92 generates a low logic of first comparison signal CS1 during a time interval when the output signal of the second integrator 90 excesses the first reference voltage Vref1. Likewise, the second comparator 94 detects whether or not the output signal of the second integrator 90 excesses a second reference voltage Vref2. It generates a high logic of second comparison signal CS2 during a time interval when the output signal of the second integrator 90 excesses the second reference voltage Vref2. The second reference voltage Vref2 is set to have a higher value than the first reference value Vref1 in such a manner that the second comparison signal CS2 is changed from a low logic into a high logic after a certain time from a time point when the first comparison signal CS1 is changed from a high logic into a low logic. Accordingly, the second comparison signal CS2 has at least one of high logic pulse positioned at the center of a low logic region of the first comparison signal CS1. When a light beam enters the land track 12 from the groove track 10 or vice versa in the optical disc 18 having the land and groove tracks 12 and 10 in a single spiral shape, the second comparison signal CS2 has a high logic of single pulse. On the other hand, when a light beam jumps from the groove track 10 into a land track 12 adjacent thereto in the diameter direction or vice versa, at least two of high logic pulses can be generated at the second comparison signal CS2. The first and second comparison signals CS1 and CS2 are applied to the reset terminal and the set terminal of a first flip-flop 96, respectively. The first flip-flop 96 emerges a low logic signal at its output terminal during a time interval when the first comparison signal CS1 remains at a high logic; while emerging a high logic signal at its output terminal during a time interval when the second comparison signal SC2 remains at a high logic. Also, the first flip-flop 96 allows the previous logic signal to be maintained as it was when both of the first and second comparison signals CS1 and CS2 have a low logic. As a result, a first trigger pulse FTRS maintaining a high logic a time interval ranged from the rising edge of the second comparison signal CS2 to the rising edge of the first comparison signal CS1 is generated at the output terminal of the first flip-flop 96. This first trigger pulse FTRS is applied to a second flip-flop 98. Then, the second flip-flop 98 inverts a logical state at its output terminal every rising edge of the first trigger pulse FTRS of the first flip-flop 96, thereby generating a land/groove identification signal LGS. The land/groove identification signal LGS may have a high logic(or low logic) when a light beam is irradiated onto the groove track 10, whereas it may have a low logic when a light beam is irradiated onto the land track 12. The land/groove identification signal LGS is changed from a high logic into a low logic or vice versa after the lapse of a time from when a light beam is shift from the groove track 10 into the land track 12 or vice versa until when the output signal of the second integrator 90 arrives at the second reference signal Vref2. Accordingly, even though a light beam temporarily departs from the groove or land track 10 or 12 being played due to an exterior impact, an eccentricity of the optical disc and so on, a logical state of the land/groove identification signal LGS is not changed. This is achieved by delaying the rising edge of the shift detection signal into the rising edge of the first trigger pulse FTRS with the aid of the second integrator 90, the first and second comparators 92 and 94 and the first flip-flop 96. The control switch 86 selects an output signal of the inverter 84 (or an output signal of the second frequency divider 82) instead of an output signal of the first frequency divider 82 (or an output signal of the inverter 84) when the land/groove identification signal LGS is changed from a high logic (or low logic) into a low logic(or high logic), whereby the reference pulse signal RPS keeps up with a phase of the wobbling pulse signal WPS in a certain time space. A tracking servo 108 detecting a tracking error signal from an electrical signal from the pickup 20 inverts the tracking error signal selectively in accordance with the land/groove identification signal LGS from the second flip-flop 98, whereby a light beam keeps up with the groove and land tracks 10 and 12 stabbly. To this end, the tracking servo 108 moves an objective lens(not shown) in the pickup 20 in the horizontal direction in accordance with the selectively inverted tracking error signal.

Furthermore, the recording/reproducing apparatus includes a delay element 100 for receiving the first trigger pulse FTRS from the first flip-flop 96, and a third flip-flop 102, a fourth flip-flop 104 and a second EOX 106 connected serially to the second comparator 94. The delay element 100 delays the first trigger pulse FTRS from the first flip-flop 96 by a predetermined period and applies the delayed trigger pulse to the input terminal D of the third flip-flop 102. The third flip-flop 102 responds to the raising edge of the second comparison signal CS2 from the second comparator 94 and latches the output signal of the delay element 100 to its output terminal Q, during the high logic period of the first trigger pulse supplied from the first flip-flop 96 to its reset terminal. As a result, a second trigger pulse STRS is generated on output terminal Q of the third flip-flop 102. The second trigger pulse STRS has the high logic state in the period corresponding to a second raising edge of the second comparison signal CS2 to the raising edge of the first comparison signal CS1. The fourth flip-flop 104 inverts the logic state on its output terminal Q at the raising edge of the output signal from the third flip-flop 102. Therefore, the second EOX 106 compares the output signals from the second and fourth flip-flops 98 and 104 and generates the polar control signal PCS. This polar control signal PCS changes the switching states of the control switch 86 selecting one of the output signals of the second divider 82 and the inverter 84. As a result, the reference pulse signal RPS has a phase corresponding to the logic value of the land/groove identification signal LGS and follows the phase of the wobble signal by a predetermined period apart.

Figure 8:
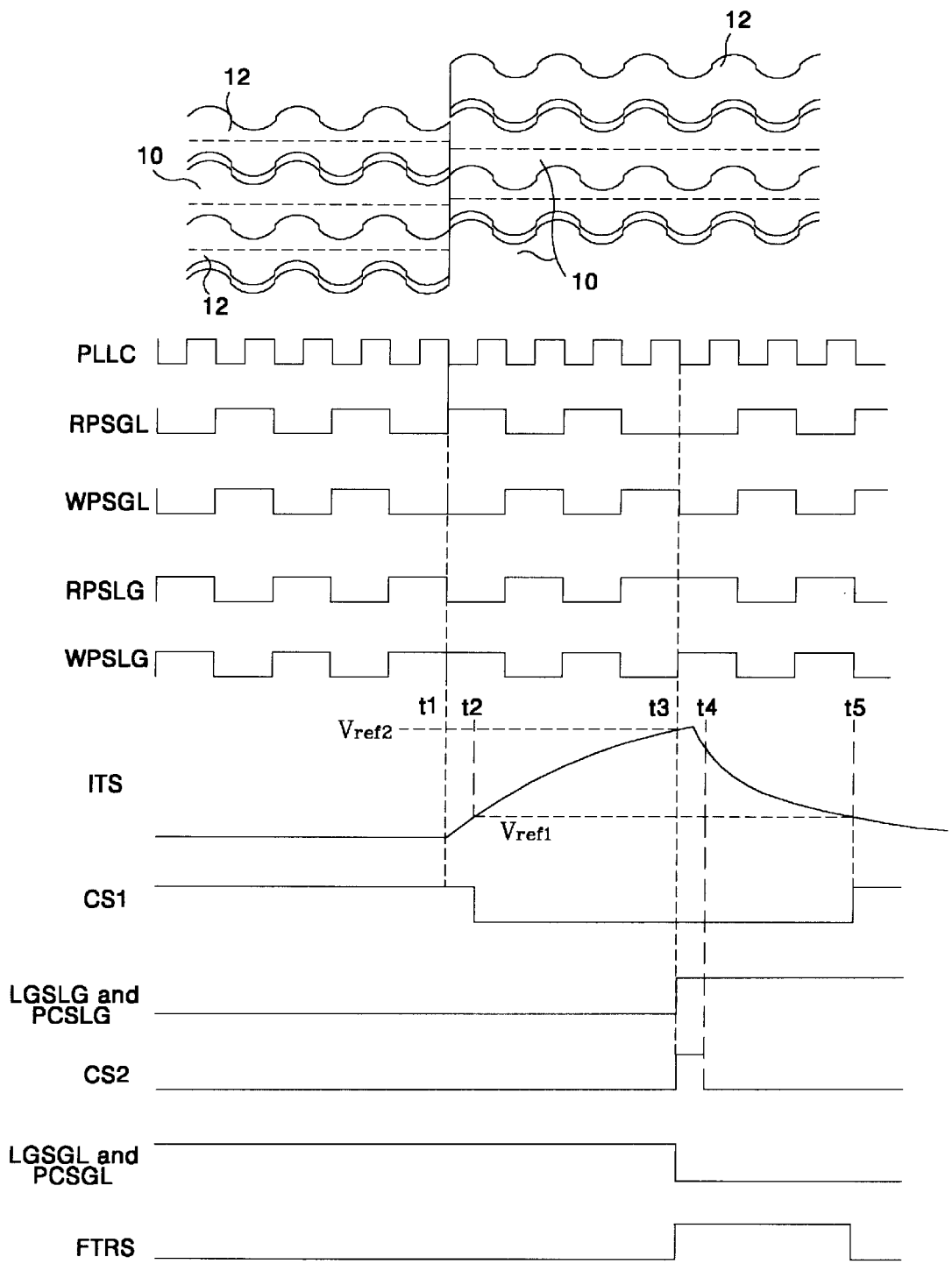
FIG. 8 is output waveform diagrams of each part of the recording/reproducing apparatus in FIG. 7 when a light beam enters a land track from a groove track or vice versa.

FIG. 8 shows waveforms of output signals of each part in FIG. 7 when a light beam enters the land track 12 from the groove track 10 or vice versa in an optical disc in which the groove track 10 and the land track 12 are alternated for once rotation. In FIG. 8, RPSGL, WPSGL, LGSGL and PCSGL represent a reference pulse signal RPS, a wobbling pulse signal WPS, a land/groove pulse signal LGS and a polar control signal PCS generated at the control switch 88, the slicer 26, the second flip-flop 98 and the second EOX 106, respectively, when a light beam enters the land track 12 from the groove track 10. On the other hand, RPSLG, WPSLG, LGSLG and PCSLG represent a reference pulse signal RPS, a wobbling pulse signal WPS, a land/groove pulse signal LGS and a polar control signal PCS generated at the control switch 88, the slicer 26, the second flip-flop 98 and second EOX 106, respectively, when a light beam enters the groove track 12 from the land track 10. It can be seen from FIG. 8 that a phase of the phase locked loop clock PLLC generated at the first frequency divider 36 is not changed even though a phase of the wobbling pulse signal WPS is inverted. An output signal ITS of the second integrator 90 begins increasing a time t1 at which phases of the wobbling pulse signals WPSGL and WPSLG are inverted, and arrives at a higher voltage than the second reference voltage Vref2. The first comparison signal CS1 maintains a low logic during a time interval from t2 into T5 at which the output signal ITS of the second integrator 90 remains at a higher value than the first reference voltage Vref1, whereas the second comparison signal CS2 maintains a high logic during a time interval from t3 into t4 at which the output signal ITS of the second integrator 90 remains at a higher value than the second reference voltage Vref2. By the first and second comparison signals CS1 and CS2, the first trigger pulse FTRS has a high logic during a time interval from t3 at which the output signal ITS of the second integrator 90 becomes higher than the second reference voltage Vref2 until t5 at which the output signal ITS becomes lower than the first reference voltage Vref1. logical states of the land/groove identification signals LGSGL and LGSLG and the polar control signals PCSGL and PCSLG are changed at the rising edge of the first trigger pulse FTRS, that is, at t3. More specifically, the signals LGSLG and PCSLG are changed from a low logic into a high logic while the signals LGSGL and PCSGL are changed from a high logic into a low logic. The land/groove identification signal and the polar control signal can be had logic values opposite to each other.

Figure 9:
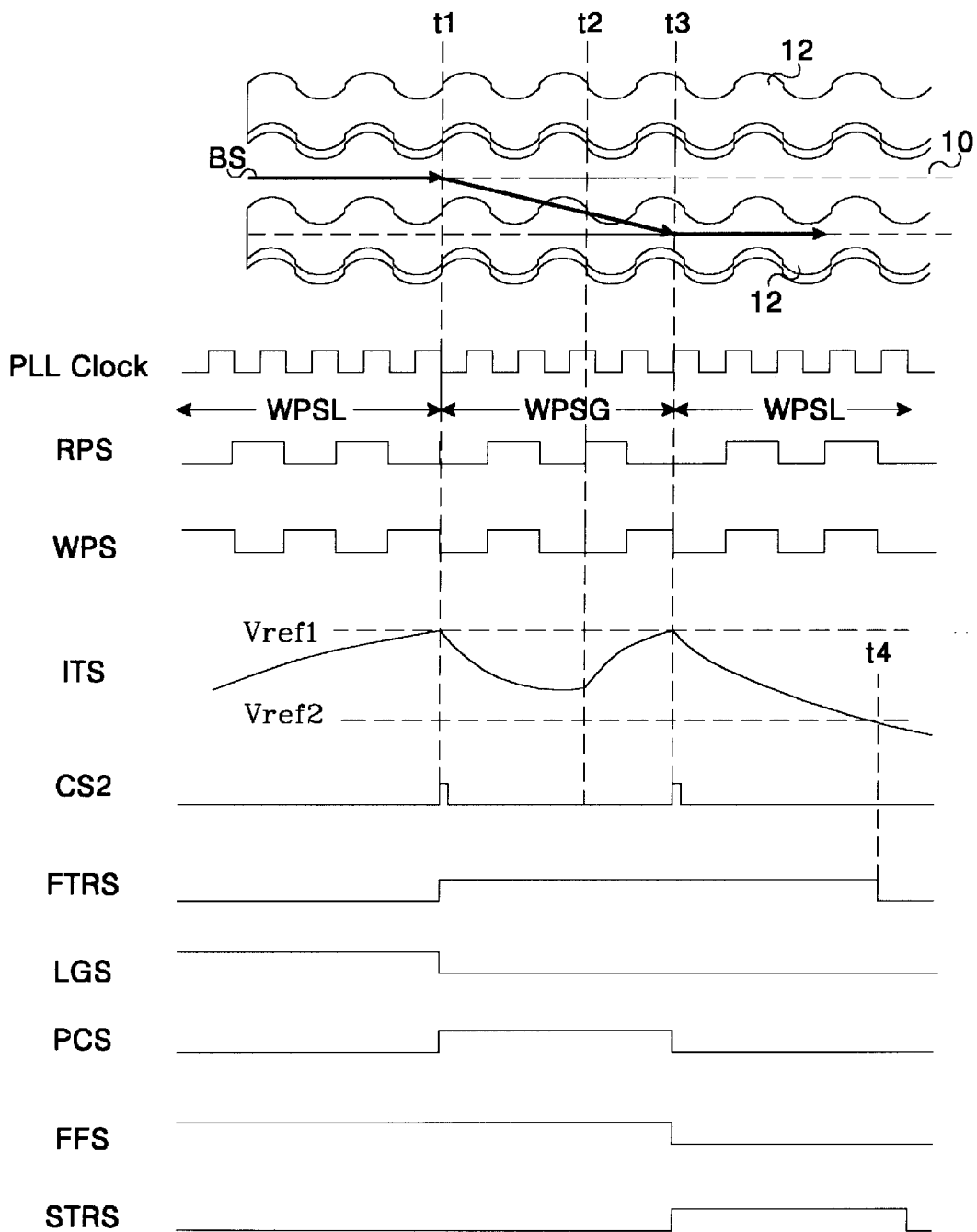
FIG. 9 is output waveform diagrams of each part of the recording/reproducing apparatus in FIG. 7 when a tracking is unstable.

FIG. 9 shows waveforms of output signals of each part in FIG. 7 when a tracking is unstable due to the replacing of the optical discs, the track jump and so on. In FIG. 9, even through a light beam BS follows the groove track 10, the reference pulse signal RPS is established as a wobble pulse signal WPSL for the land track 12. Also, the light beam BS starts to move from the groove track 10 to the land track 12 at t1 and arrives to the boundary side of the land track 12 at t2. In this case, the output signal ITS of the second integrator 90 is temporally enlarged than the second reference voltage Vref2 at each t1 and t2. At t4 when the light beam traces the center line of the land track 12, the output signal ITS of the second integrator 90 is dropped to the voltage lowest than first reference voltage Vref1. By the output signal ITS of the second integrator 90, the second comparison signal CS2 has a high logic pulse at each t1 and t3. Also, the first trigger pulse FTRS maintains the high logic state for the period proceeding from t1 to t4, and the second trigger STRS has the high logic during the period corresponding to t3 to t4. Therefore, the land/groove identification signal LGS varies from the high logic state to the low logic state at t1, while the polar control signal PCS revaries from the high logic state to the low logic state after it is gone from the low logic to the high logic. The reference pulse signal RPS is changed from the wobble pulse signal WPSL of the land track 12 to the wobble pulse signal WPSG of the groove track 10 at t1 and from the wobble pulse signal WPSG of the groove track 10 to the wobble pulse signal WPSL of the land track 12 at t3. As a result, even through the light beam BS traces the land or groove track 12 or 10 in the unstable, the land/groove identification signal LGS is accurately detected and the phase of the reference pulse signal RPS follows accurately the phase of wobble signal varying according to the land and groove tracks.

As described above, a recording/reproducing apparatus for a recording medium according to the present invention permits a driving of the recording medium using a wobbling signal without a polarity switching of the wobbling signal according to the land and groove tracks, that is, without a land/groove identification information. Accordingly, the recording/reproducing apparatus can stabbly record an information on the land and groove tracks even though the accessed land or groove tracks are frequently changed. Also, the recording/reproducing apparatus can maintain a rotation speed of the optical disc even though the driven land and groove tracks are frequently changed.

Furthermore, the recording/reproducing apparatus for a recording medium according to the present invention generates a wobbling signal and a reference pulse signal with respect to each synchronized land and groove track and compares the wobbling signal with the reference pulse signal. Accordingly, it can accurately identify whether a light beam is being irradiated onto any one of the land and groove tracks. As a result, the recording/reproducing apparatus according to the present invention is capable of performing the tracking control accurately and stabbly as well as performing a recording/reproduction of an information accurately.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording and reproducing a recording medium, comprising the steps of:
   (A) detecting a wobbling signal from a recording medium having wobbled land and groove tracks;
   (B) multiplying the frequency of the wobbling signal;
   (C) generating a predetermined reference signal based on the multiplied wobble signal; and
   (D) responding to the reference signal to perform a recording/reproduction of the recording medium.

2. The method as claimed in claim 1, wherein the wobbled land and groove tracks are formed intermittently.

3. The method as claimed in claim 1, wherein the step (B) includes delaying the wobbling signal and comparing the wobbling signal with the delayed wobbling signal.

4. The method as claimed in claim 3, further comprising the step of:
   waveform-shaping the wobbling signal into a wobbling pulse signal having a rectangular wave shape.

5. The method as claimed in claim 1, wherein the step (C) includes:
   (c1) comparing a phase of the multiplied wobble signal with that of the reference signal to detect a phase error signal;
   (c2) integrating the phase error signal; and
   (c3) generating a reference clock according to a voltage level of the integrated phase error signal.

6. The method as claimed in claim 5, wherein the wobbled land and groove tracks are formed intermittently.

7. The method as claimed in claim 6, wherein the integrating step (c2) includes selectively performing an integration of the phase error signal in accordance with whether or not the wobbling signal exists.

8. The method as claimed in claim 6, wherein the integrating step (c2) includes:

integrating the phase error signal when the wobbling signal is detected; and holding the phase error signal when the wobbling signal is not detected.

9. The method as claimed in claim 1, further comprising the steps of:

detecting a playing speed error of the land and groove tracks from the reference signal; and controlling a playing speed of the land and groove tracks in accordance with the playing speed error.

10. The method as claimed in claim 1, further comprising the steps of:

detecting whether any one of the land and groove tracks is being accessed on a basis of a phase relationship of the reference signal with the wobbling signal; and selectively inverting the polarity of a tracking error signal in accordance with a type of the track being accessed and controlling a position of a light beam in accordance with the selectively inverted tracking error signal.

11. An apparatus for recording and reproducing a recording medium, comprising:

wobbling signal detecting means for detecting a wobbling signal from a recording medium having wobbled land and groove tracks;

frequency multiplying means for multiplying the frequency of the wobbling signal;

reference signal generating means for generating a predetermined reference signal based on the wobble signal multiplied by the frequency multiplying means; and recording/reproducing means for responding to the reference signal to perform a recording/reproduction of the recording medium.

12. The apparatus as claimed in claim 11, wherein the wobbled land and groove tracks are formed intermittently.

13. The apparatus as claimed in claim 11, further comprising:

a slicer for waveform-shaping the wobbling signal to be transferred from the wobbling signal detecting means to the frequency multiplying means.

14. The apparatus as claimed in claim 13, wherein the frequency multiplying means includes:

a delay for delaying the wobbling signal from the slicer; and a logical element for comparing the delayed wobbling signal from the delay with the wobbling signal from the slicer to generate an edge detecting signal having a width corresponding to a delay time of the delay.

15. The apparatus as claimed in claim 11, wherein the reference signal generating means includes:

a phase comparator for comparing a phase of the wobble signal multiplied by the frequency multiplying means with that of the reference signal to detect a phase error signal;

an integrator for integrating the phase error signal; and a voltage controlled oscillator for generating the reference signal having a different frequency in accordance with a voltage level of the integrated phase error signal.

16. The apparatus as claimed in claim 15, wherein the wobbled land and groove tracks are formed intermittently.

17. The apparatus as claimed in claim 16, wherein the integrator selectively performs an integration of the phase error signal in accordance with whether or not the wobbling signal exists.

18. The apparatus as claimed in claim 16, wherein the integrator integrates the phase error signal when the wobbling signal is detected, and holds the phase error signal when the wobbling signal is not detected.

19. The apparatus as claimed in claim 11, further comprising:

error detecting means for detecting a playing speed error of the land and groove tracks from the reference signal; and speed control means for controlling a playing speed of the land and groove tracks in accordance with the playing speed error.

20. The apparatus as claimed in claim 11, further comprising:

land/groove identifying means for detecting whether any one of the land and groove tracks is being accessed on a basis of a phase relationship of the reference signal with the wobbling signal; and a tracking servo for selectively inverting the polarity of a tracking error signal in accordance with an output signal of the land/groove identifying means and controlling a position of a light beam in accordance with the selectively inverted tracking error signal.

* * * * *